United States Patent
Yoo et al.

(10) Patent No.: US 9,667,880 B2
(45) Date of Patent: May 30, 2017

(54) ACTIVATING FLASH FOR CAPTURING IMAGES WITH TEXT

(71) Applicant: QUALCOMM Incorporated, San Diego, CA (US)

(72) Inventors: Seungwoo Yoo, Seoul (KR); Hyun-Mook Cho, Seoul (KR); Hee-Seok Lee, Seoul (KR); Duck Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 14/466,659

(22) Filed: Aug. 22, 2014

(65) Prior Publication Data

US 2016/0057331 A1    Feb. 25, 2016

(51) Int. Cl.
| | |
|---|---|
| G06K 9/00 | (2006.01) |
| H04N 5/235 | (2006.01) |
| H04N 5/232 | (2006.01) |
| H04N 9/07 | (2006.01) |
| G06K 9/03 | (2006.01) |
| G06K 9/46 | (2006.01) |

(52) U.S. Cl.
CPC .......... *H04N 5/2354* (2013.01); *G06K 9/036* (2013.01); *G06K 9/4661* (2013.01); *H04N 5/2351* (2013.01); *H04N 5/23293* (2013.01); *H04N 9/07* (2013.01)

(58) Field of Classification Search
CPC .............. H04N 5/23293; H04N 5/2354; H04N 5/2351; G06K 9/036; G06K 9/4661
See application file for complete search history.

(56) References Cited

U.S. PATENT DOCUMENTS

| | | | |
|---|---|---|---|
| 8,184,194 B2 | 5/2012 | Sato et al. | |
| 8,610,976 B1 | 12/2013 | Cook et al. | |
| 2002/0113882 A1* | 8/2002 | Pollard | H04N 1/00835 348/239 |
| 2005/0231740 A1* | 10/2005 | Uchino | H04N 1/6086 358/1.9 |
| 2008/0180530 A1 | 7/2008 | Keam | |
| 2011/0305388 A1 | 12/2011 | Wedi et al. | |

(Continued)

FOREIGN PATENT DOCUMENTS

EP    2339534 A1    6/2011

OTHER PUBLICATIONS

International Search Report and Written Opinion for International Application No. PCT/US2015/044453, ISA/EPO, Date of Mailing Dec. 21, 2015, 14 pages.

(Continued)

*Primary Examiner* — Gregory M Desire
(74) *Attorney, Agent, or Firm* — Toler Law Group, PC

(57) ABSTRACT

A method, which is performed by an electronic device, of automatically activating a flash for an image sensor of the electronic device is disclosed. The method may include receiving a first image including at least one text region and determining feature data characterizing the at least one text region in the first image. The method may also identify at least one candidate specular reflection region in the first image. Based on the feature data and the at least one candidate specular reflection region, the flash may be activated. Upon activating the flash, a second image including the at least one text region may be captured.

30 Claims, 13 Drawing Sheets

(56) References Cited

U.S. PATENT DOCUMENTS

| | | |
|---|---|---|
| 2014/0375865 A1 | 12/2014 | Shroff et al. |
| 2015/0358549 A1 | 12/2015 | Cho et al. |
| 2016/0057331 A1* | 2/2016 | Yoo .................... H04N 5/23293 |
| | | 348/333.01 |
| 2016/0117544 A1* | 4/2016 | Hoyos ................ H04N 5/23219 |
| | | 348/78 |

OTHER PUBLICATIONS

Koo, H.I., et al., "Composition of a Dewarped and Enhanced Document Image from Two View Images," IEEE Transactions on Image Processing, Jul. 2009, vol. 18, No. 7, IEEE, Piscataway, NJ, pp. 1551-1562.

Pollard, S., et al., "Building Cameras for Capturing Documents," International Journal of Document Analysis and Recognition (IJDAR), 2005, vol. 7, Springer, New York, NY, pp. 123-137.

Pollard S., et al., "Building Cameras for Capturing Documents," Dec. 9, 2003, HP Labs Europe, Bristol, BS34 8QZ, United Kingdom, 32 pages.

* cited by examiner

ACTIVATING FLASH FOR CAPTURING IMAGES WITH TEXT

TECHNICAL FIELD

The present disclosure relates generally to capturing images in electronic devices, and more specifically, to activating a flash for capturing images in electronic devices.

BACKGROUND

Modern electronic devices such as a smartphone, a tablet computer, smart glasses, and the like are typically equipped with one or more camera units or modules. In these electronic devices, the camera units or modules are used to capture photographs of a variety of types of scenes and objects. Such electronic devices may also have a variety of capabilities or functions for processing the captured photographs such as image processing functions, text recognition functions, etc.

Some users may utilize the electronic devices equipped with camera modules to capture photographs of text objects (e.g., a business card) or a scene including text objects. For example, a user may use his or her electronic device to photograph a street scene including text objects such as street signs. In this case, one or more photographs of the scene including the text objects may be stored in the electronic device and processed for text recognition.

However, some photographs including text may suffer from a variety of lighting conditions that degrade image quality such as specular reflection, diffuse reflection, low light condition, etc. For example, conventional electronic devices may be used to capture a photograph of a text object having a relatively glossy or shiny surface (e.g., a business card printed on glossy paper, a magazine, or the like) in the presence of one or more light sources. In such a case, light from the light sources may reflect from the surface of the text object and result in specular reflection in one or more portions of the photograph. Further, when a specular reflection portion coincides with a portion of text or characters in the text object, the conventional electronic devices may not be able to accurately recognize the text in the text object.

SUMMARY

The present disclosure provides methods and apparatus for automatically activating a flash for an image sensor based on feature data characterizing at least one text region in an image and at least one candidate specular reflection region in the image.

According to one aspect of the present disclosure, a method, which is performed by an electronic device, of automatically activating a flash for an image sensor of the electronic device is disclosed. The method may include receiving a first image including at least one text region and determining feature data characterizing the at least one text region in the first image. The method may also identify at least one candidate specular reflection region in the first image. Based on the feature data and the at least one candidate specular reflection region, the flash may be activated. Upon activating the flash, a second image including the at least one text region may be captured. This disclosure also describes apparatus, a device, a system, a combination of means, and a computer-readable medium relating to this method.

According to another aspect of the present disclosure, an electronic device for automatically activating a flash for an image sensor is disclosed. The electronic device may include a processor configured to receive a first image including at least one text region. The processor may include a text region detection unit configured to determine feature data characterizing the at least one text region in the first image and a reflection region identification unit configured to identify at least one candidate specular reflection region in the first image. The processor may also include a flash control unit configured to activate the flash based on the feature data and the at least one candidate specular reflection region. The image sensor is configured to capture a second image including the at least one text region upon activating the flash.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
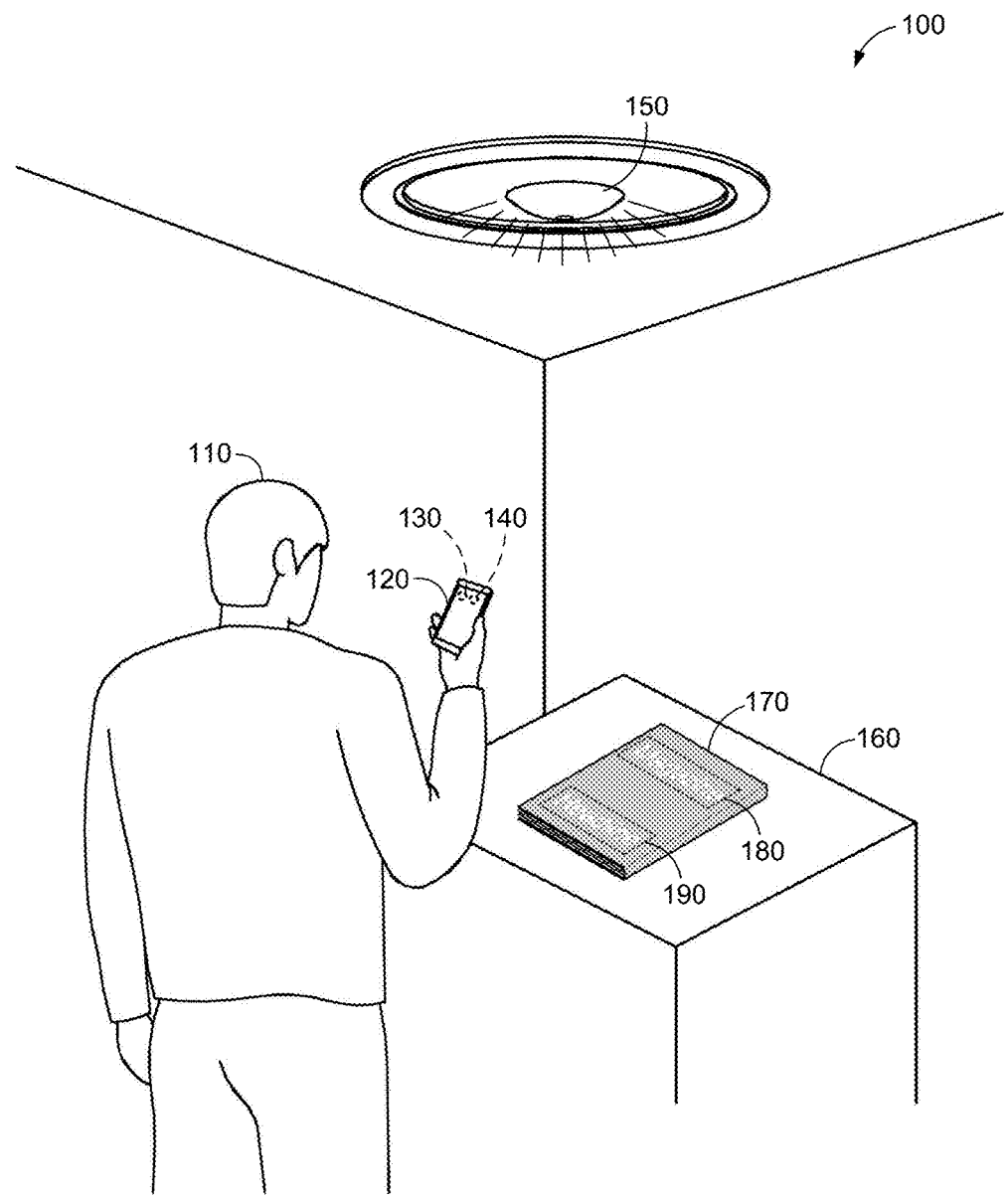
FIG. 1 illustrates an electronic device configured to capture an image of a scene including an object with text according to one embodiment of the present disclosure.

FIG. 1 illustrates an electronic device 120 configured to capture one or more images of a scene 100 including an object 170 with a plurality of text regions 180 and 190 according to one embodiment of the present disclosure. In FIG. 1, a user 110 of the electronic device 120 is located in a room including a light source 150 in a ceiling and a table 160. While the light source 150 irradiates light from the ceiling, the user 110 may operate the electronic device 120 equipped with an image sensor 130 and a flash 140 to capture an image of the scene 100 in the room that includes the object 170 disposed on the table 160. As used herein, the term "capture" or "capturing" may indicate receiving or generating an image of a scene and may include an operation of sensing, detecting, or recording the image. As illustrated herein, the electronic device 120 may be any suitable device equipped with image capturing and processing capabilities such as a digital camera (e.g., a DSLR camera), a smartphone, a wearable computer (e.g., smart glasses, a smart watch, etc.), a personal computer, a laptop computer, a tablet computer, a gaming device, etc.

The object 170 may be a magazine including the plurality of text regions 180 and 190. Although the object 170 is illustrated as a magazine, it may be any object with a surface that may include, display, or show any suitable text (e.g., one or more characters). In some embodiments, the surface of the object 170 may exhibit a specular reflection effect according to surface characteristics of the object 170. For example, when the surface of the object 170 is glossy, shiny, polished, silky, lustrous, glassy, or the like, such a surface may reflect light resulting in one or more specular reflection regions in the object 170. When an image of the object 170 with such a surface is captured, the image may also include the specular reflection regions that may degrade quality of the image.

The plurality of text regions 180 and 190 in the object 170 may include text or characters of a similar size, color, pattern, or the like. As shown, the text region 180 may include text characters "Magazine" as a masthead or a title and the text region 190 may include text characters "Headline" as a sub-heading. In the illustrated object 170, the characters in the plurality of text regions 180 and 190 may be white in color, while a color of the object 170 outside the characters may be gray.

The electronic device 120 equipped with the image sensor 130 may be configured to capture and display one or more images of the scene 100. For example, the user 110 may capture an image of the scene 100 that includes the object 170 with the plurality of text regions 180 and 190. The electronic device 120 may store the captured image for access and/or perform text recognition on the image to recognize text in the text regions 180 and 190. In one embodiment, the electronic device 120 may operate in a preview mode to capture one or more preview images of the scene 100 that include the object 170. In this mode, the preview images may be stored temporarily in a storage unit of the electronic device 120.

Figure 2:
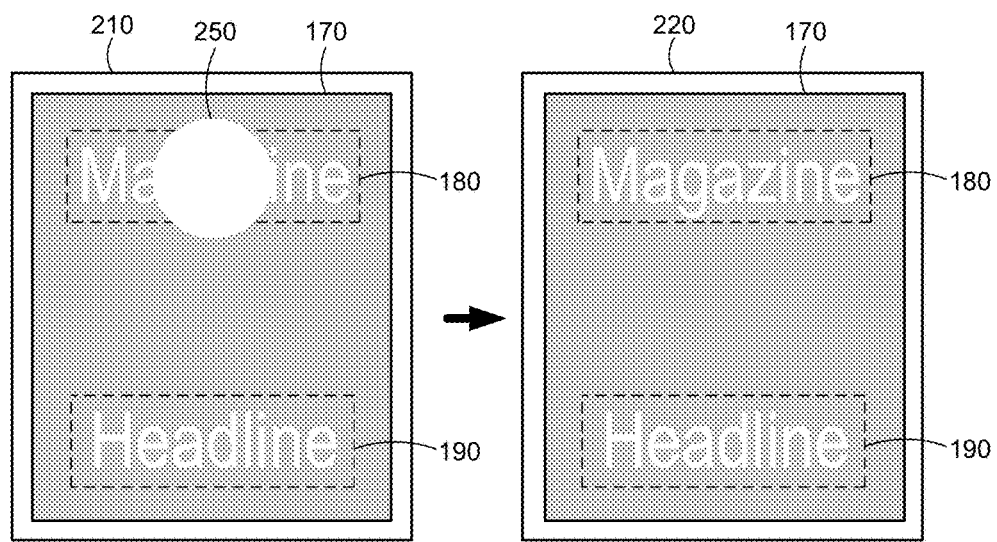
FIG. 2 depicts a flow diagram for identifying a specular reflection region in a first image of an object with a plurality of text regions and capturing a second image by activating a flash to reduce or remove the specular reflection region, according to one embodiment of the present disclosure.

Upon capturing an image of the scene 100, the electronic device 120 may perform an image analysis of the captured image to determine whether to activate the flash 140 for capturing a next image of the scene 100 that includes the object 170. FIG. 2 depicts a flow diagram for identifying a specular reflection region 250 in a first image 210 of the object 170 with the plurality of text regions 180 and 190 and capturing a second image 220 by activating a flash to reduce or remove the specular reflection region 250, according to one embodiment of the present disclosure. The electronic device 120 may receive or capture the first image 210 of the object 170 including the text regions 180 and 190 without using the flash 140. As shown, the first image 210 includes the specular reflection region 250 over a portion of the text region 180.

Upon receiving or capturing the first image 210, the electronic device 120 may determine feature data characterizing the text regions 180 and 190 in the first image 210. As used herein, the term "feature data" may refer to any data or information describing or relating to one or more text regions in an image and may include data or information describing or relating to color, intensity, boundary, text confidence, polarity, etc. of the text regions. For example, feature data may include data describing or relating to one or more text regions such as confidence data, boundary data, sharpness data, mean intensity data, polarity data, and histogram data, document type data, as described below in more detail with reference to FIG. 4. In the illustrated embodiment, the electronic device 120 may determine feature data such as color values, intensity values, boundaries, text confidence values, polarity values, etc. for the text regions 180 and 190.

The electronic device 120 may be configured to identify one or more candidate specular reflection regions in the first image 210. According to some embodiments, a plurality of color values for a plurality of pixels in the first image 210 may be determined for identifying the one or more candidate specular reflection regions. As shown in the first image 210 of FIG. 2, the electronic device 120 may determine that color values of the text "Magazine" in the text region 180 and the text "Headline" in the text region 190 are indicative of a white color. The specular reflection region 250, which may result from a specular reflection of light from the light source 150, may have a white color value and may overlap a portion of the text region 180 in the first image.

In one embodiment, the electronic device 120 may identify one or more regions in the first image 210 that are characterized by a white color as candidate specular reflection regions. For example, the text regions 180 and 190 including the text "MAGAZINE" and "Headline," respectively, and the specular reflection region 250 may be characterized by a color value indicative of a white color and thus identified as candidate specular reflection regions. In the illustrated embodiment, the "white color" may refer to a color produced by any suitable combination of red (R), green (G), and blue (B) colors. Given an 8-bit color code, for example, a white color may be represented by a value "255" for each of the R, G, and B values. However, the white color may also include any other colors that are substantially similar or close to such R, G, and B values or any combinations thereof.

Based on the identified candidate specular reflection regions 180, 190, and 250 and the feature data characterizing the text regions 180 and 190, the electronic device 120 may determine whether to activate the flash 140 for capturing the second image 220. If it is determined that the flash 140 is to be activated, the electronic device 120 may capture the second image 220 upon activating the flash 140. Otherwise, the electronic device 120 may capture an image without activating the flash 140. As used herein, the term "upon" may mean immediately or soon after or during an occurrence of an event or an act. For example, the second image 220 may be captured simultaneously with or immediately after an activation of the flash 140. In the illustrated embodiment, the second image 220 captured upon activating the flash 140 may eliminate or reduce the specular reflection region 250 in the first image 210.

Figure 3:
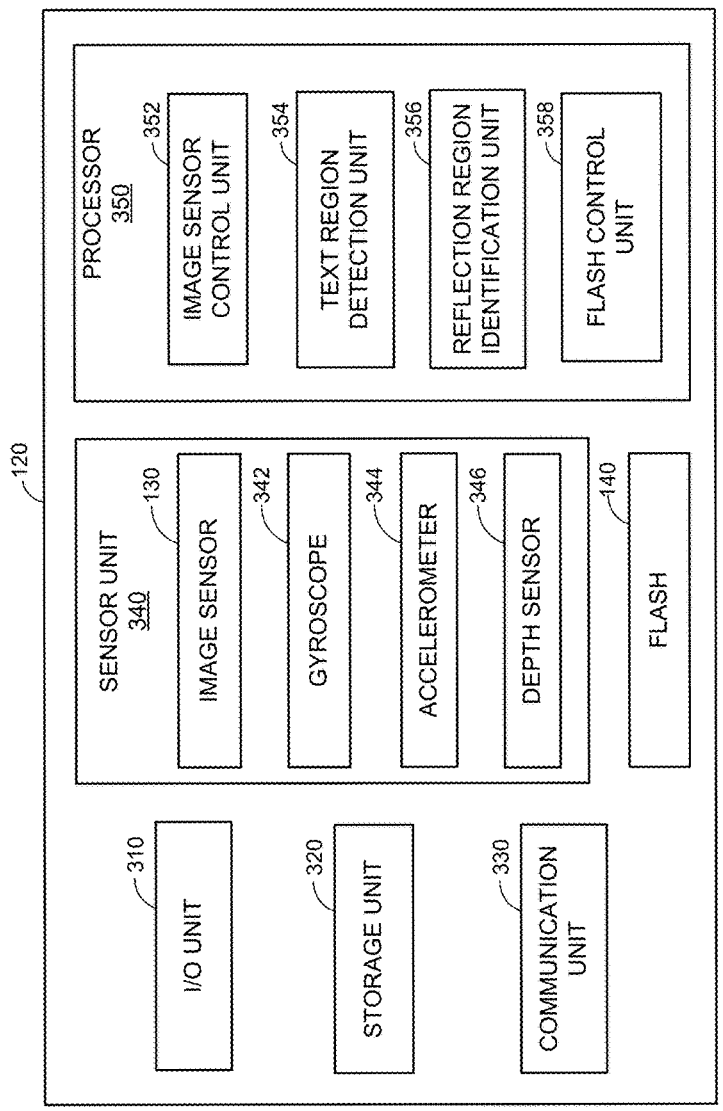
FIG. 3 is a block diagram of an electronic device configured to capture an image of at least one object with one or more text regions by automatically activating a flash to compensate for a specular reflection effect determined from one or more images of the at least one object, according to one embodiment of the present disclosure.

FIG. 3 is a block diagram of the electronic device 120 configured to capture an image of at least one object with one or more text regions by automatically activating a flash to compensate for a specular reflection effect, according to one embodiment of the present disclosure. The electronic device 120 may include the flash 140, an I/O unit 310, a storage unit 320, a communication unit 330, a sensor unit 340, and a processor 350. The sensor unit 340 may include the image sensor 130, a gyroscope 342, an accelerometer 344, and a depth sensor 346. The processor 350 may include an image sensor control unit 352, a text region detection unit 354, a reflection region identification unit 356, and a flash control unit 358.

The I/O unit 310 may be configured to receive commands from the user 110 and/or output information for the user 110. In some embodiments, the I/O unit 310 may receive a command or input from the user 110 to select a camera mode (e.g., an autofocus mode, a text mode, a night mode, a portrait mode, etc.) for the image sensor 130. During the selected camera mode, the user 110 may operate the image sensor 130 to capture an image of a scene. For example, the user 110 may operate the image sensor 130 in a text mode to capture one or more preview images of a scene that includes an object with text. The captured preview images may be temporarily stored in the storage unit 320 and displayed in real time on the I/O unit 310. The I/O unit 310 in the electronic device 120 may also be configured to receive a command or input from the user 110 for capturing one or more subsequent images of the scene. As illustrated herein, the I/O unit 310 may be any suitable device capable of receiving commands and/or outputting information and include a touch screen, a dial, a button, a keypad, a touchpad, a display screen, or the like.

The storage unit 320 may be configured to store one or more captured images or preview images. For example, the storage unit 320 may store image data for one or more preview images of a scene with one or more text regions that may be captured while the image sensor 130 is operating in a preview mode. In this case, the image data may include pixel information such as a number of pixels, color values for the pixels, etc. The images or image data may be accessed by the processor 350 to determine whether to activate the flash 140 for capturing a next image that includes the text regions in response to an input or a command of the user 110 received via the I/O unit 310. The storage unit 320 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

Additionally, the storage unit 320 may store a classifier database that may classify text and/or non-text for identifying one or more text regions in an image or a preview image of a scene. In one embodiment, the classifier database may include a plurality of probability models for a plurality of languages (e.g., English, French, and the like) that can be used to determine a probability that given text is associated with one of the languages. The storage unit 320 may also store a character information database that may be used for selecting one or more specular reflection regions from one or more candidate specular reflection regions. For each of the languages, the character information database may include patterns or geometric data of a plurality of characters used in the language, images of glyphs representing the plurality of characters in the language, and/or at least one feature associated with each individual glyph in the language. In addition, the storage unit 320 may store a document type database that may be used for determining a document type for one or more text regions from an image including the text regions. In the document type database, a plurality of predetermined document types (e.g., a magazine, a business card, a calendar, etc.) may be mapped to arrangements or layouts of text regions (e.g., locations and sizes of the text regions) in the document types and predetermined intensities of light from the flash 140.

In the sensor unit 340, the image sensor 130 may be configured to receive one or more preview images in a preview mode or capture one or more images in response to an input or a command from the user 110. The electronic device 120 may employ any suitable image sensing devices for the image sensor 130 (e.g., a camera or a camera module) that are capable of capturing or sensing an image of a scene or an object. For capturing the images, the image sensor 130 may operate synchronously with the flash 140 in the electronic device 120.

According to one embodiment, the flash 140 may be activated any suitable number of times for capturing one or more images of a scene. The flash 140 may be any device capable of emitting light or a burst of light for capturing an image of a scene. Although the electronic device 120 is shown with the image sensor 130 and the flash 140, it may include any suitable number of image sensors and flashes.

In the sensor unit 340, the gyroscope 342, the accelerometer 344, and the depth sensor 346 may be used for determining geometric information indicative of depth information of the image sensor 130 to one or more text regions in an image, an angle between a plane in which the text regions are disposed and a plane in which the image sensor 130 is disposed, etc. The gyroscope 342 may be configured to detect or measure an orientation of the electronic device 120 that may be used for determining the angle between the plane of the text regions and the plane of the image sensor 130 or the electronic device 120. The accelerometer 344 may be configured to detect or measure an acceleration of the electronic device 120 including a magnitude and a direction of the acceleration. Additionally or alternatively, the accelerometer 344 may determine an orientation of the electronic device 120 based on the acceleration data. In one embodiment, it may be assumed that one or more text regions in a captured image are disposed parallel or orthogonal to the surface of the earth. In this case, the angle between the plane of the text regions and the plane of the electronic device may be determined from the orientation of the electronic device 120 at the time of capturing the image and the plane of the text regions (e.g., a plane parallel or orthogonal to the surface of the earth).

The depth sensor 346 may be configured to determine depth information for one or more images of a scene received or captured by the image sensor 130. For example, the depth sensor 346 may include a light source capable of generating a beam of light (e.g., infrared, laser, etc.). The depth sensor 346 may emit a beam of light toward an object with text in a scene and receive a beam that has been reflected from the object. A depth or distance to the object may then be calculated from a time that the beam took to travel to the object and back. In one embodiment, the depth sensor 346 may be configured to determine a plurality of depths of the image sensor 130 to one or more text regions in a received scene. From the plurality of depths for the one or more text regions, the depth sensor 346 may determine an angle between the plane in which the text regions are disposed and the plane in which the image sensor 130 or the electronic device 120 is disposed. For example, if the text regions are not parallel or orthogonal to the surface of the earth, the angle between the plane of the text regions and the plane of the electronic device 120 may be determined from the plurality of depths for the text regions at the time of capturing the image including the text regions. The determined geometric information including the depth information and/or the angle may then be provided to the flash control unit 358 for adjusting an intensity of light to be output from the flash 140 and/or a direction of the flash 140. Additionally or alternatively, the electronic device 120 may include a plurality of image sensors that are capable of capturing a stereoscopic or 3D image of a scene, from which the geometric information may be determined.

The processor 350 may be configured to determine whether the flash 140 is activated for capturing an image of a scene that includes at least one text region based on one or more images including the at least one text region. If it is determined that the flash 140 is to be activated, the processor 350 may synchronously control the image sensor 130 and the flash 140 to capture the image in response to an input or a command from the user 110. Otherwise, an image may be captured without activating the flash 140 in response to the input or command from the user 110.

The image sensor control unit 352 in the processor 350 may be configured to control the image sensor 130 for capturing images. In one embodiment, the images may be preview images that are captured and stored temporarily for display during a preview mode. In another embodiment, the images may be captured in an image capturing mode in which the images may be stored for a longer period of time.

In some embodiments, the image sensor control unit 352 may receive one or more preview images including one or more text regions from the storage unit 320 and adjust at least one image capturing parameter for the image sensor 130 based on the preview images. For example, the image sensor control unit 352 may determine a focus value of each of the preview images by determining a sharpness value for each of the images. If a focus value of a preview image is less than a threshold focus value, the image sensor control unit 352 may adjust a focus parameter among the at least one image capturing parameter for the image sensor 130. After adjusting the image capturing parameter, the image sensor control unit 352 may control the image sensor 130 to capture one or more subsequent preview images including the text regions. Since the subsequent preview images are captured with the adjusted focus parameter, the captured images may have an improved image quality and may be used in determining whether to activate the flash 140 for the image sensor 130.

The text region detection unit 354 in the processor 350 may be configured to receive one or more images including at least one text region from the storage unit 320 and detect the at least one text region in each of the images. Given an image with at least one text region, one or more candidate text regions may be detected in the image using any suitable text candidate extraction schemes such as a blob clustering method, an edge based method, a connected-component based method, a texture based method, or the like. Upon detecting the candidate text regions, the text region detection unit 354 may extract a set of features from each of the candidate text regions in the image. The text region detection unit 354 may then generate a classification score for the set of features associated with each of the candidate text regions based on the classifier database from the storage unit 320. Alternatively, the classifier database may be received from an external device via the communication unit 330. Based on the classification scores associated with the candidate text regions, the text region detection unit 354 may identify the at least one text region in the image.

Upon identifying at least one text region in one or more images, the text region detection unit 354 may determine feature data characterizing the at least one text region in the images. In one embodiment, the text region detection unit 354 may generate feature data for the at least one text region by determining color values, intensity values, boundaries, text confidence values, polarity values, etc. of the at least one text region. The feature data may then be provided to the flash control unit 358 for determining whether to activate the flash 140 for the image sensor 130.

The one or more images including at least one text region that are provided to the text region detection unit 354 may also be provided to the reflection region identification unit 356 in the processor 350. The reflection region identification unit 356 may be configured to identify one or more candidate specular reflection regions in each of the images. In one embodiment, the reflection region identification unit 356 may determine a plurality of color values for a plurality of pixels in each of the images with at least one text region and identify one or more regions in each image that have color values indicative of a white color as the candidate specular reflection regions. In another embodiment, the images with at least one text region may be converted into grayscale images having a plurality of grayscale pixels and one or more candidate reflection regions may be identified based on intensity values for the grayscale pixels in the grayscale images. For example, if each of the intensity values for the grayscale pixels in one or more regions is determined to be indicative of a white color, the one or more regions may be identified as the candidate specular reflection regions. The identified candidate specular reflection regions may be provided to the flash control unit 358 for use in determining whether to activate the flash 140 for the image sensor 130.

The flash control unit 358 in the processor 350 may be configured to determine whether to activate the flash 140 upon receiving feature data characterizing one or more identified text regions from the text region detection unit 354 and one or more candidate specular reflection regions from the reflection region identification unit 356. In one embodiment, the flash control unit 358 may select, from the candidate specular reflection regions, one or more specular reflection regions that are located outside the identified text regions based on the feature data. For example, one or more specular reflection regions may be selected from the candidate specular reflection regions based on feature data (e.g., boundary data, intensity data, confidence data, sharpness data, or the like) characterizing the identified text regions. Upon determining that the flash 140 is to be activated, the flash control unit 358 may activate the flash 140 in response to an input or a command of the user 110 to capture one or more subsequent images including the text regions.

According to one embodiment, the flash control unit 358 may access the character information database in the storage unit 320 and select one or more specular reflection regions from the received candidate specular reflection regions. For example, the flash control unit 358 may determine whether any portions of the received candidate specular reflection regions correspond to any portions of text regions by comparing one or more stroke widths of characters in the received candidate specular reflection regions and stroke widths of reference characters from the character information database. If the stroke widths are determined to be similar beyond a similarity threshold, at least a portion of the candidate specular reflection regions located outside the one or more portions of the text regions may be selected as the one or more specular reflection regions. Alternatively, the character information database may be received from an external device via the communication unit 330. Based on the selected specular reflection regions, the flash control unit 358 may determine whether to activate the flash 140 for capturing one or more subsequent images that include the text regions.

In some embodiments, the flash control unit 358 may also receive the one or more captured images including the at least one text region and determine a dispersion value indicative of a degree of dispersion for the selected specular reflection regions in each of the received images. The dispersion value for the selected specular reflection regions may be represented by using locations, color intensities, color histograms, binarized shapes, etc. of the selected specular reflection regions. For example, the flash control unit 358 may determine a location of each of the selected specular reflection regions in each image and calculate the dispersion value for the selected specular reflection regions. If the dispersion value for the selected specular reflection regions is less than a threshold dispersion value, the flash control unit 358 may determine that the flash 140 is to be activated for the image sensor 130.

Additionally or alternatively, the flash control unit 358 may determine whether to activate the flash 140 based on a ratio of the selected specular reflection regions to an area of each of the received image. In one embodiment, the ratio may be calculated by dividing a number of pixels in the selected specular reflection regions of an image by a total number of pixels in the image. If the ratio is greater than or equal to a threshold ratio value, the flash control unit 358 may determine that the flash 140 is to be activated.

Upon determining that the flash 140 is to be activated for the image sensor 130, the flash control unit 358 may adjust an intensity of light to be output from the flash 140. In one embodiment, the intensity of light may be adjusted based on at least one of the feature data and geometric information received from the sensor unit 340. For example, if a sharpness value of the feature data for the identified text regions is less than a threshold sharpness value, the flash control unit 358 may increase the intensity of light to be output from the flash 140. The geometric information may include depth information (e.g., depth or distance) of the one or more text regions to the electronic device 120 and an angle between a plane in which the text regions are disposed and a plane in which the electronic device 120 is disposed. In this case, if the angle is less than a threshold angle, the flash control unit 358 may increase the intensity of light to be output from the flash 140.

Additionally or alternatively, the flash 140 may be movably disposed on the electronic device 120 and the flash control unit 358 may adjust a direction of the flash 140 based on the geometric information received from the sensor unit 340. In one embodiment, the direction of the flash 140 may be adjusted based on the angle between a plane in which the text regions are disposed and a plane in the electronic device 120 is disposed. For example, if the planes for the electronic device 120 and the text regions are parallel to each other, the flash control unit 358 may adjust a direction of the flash 140 to prevent a specular reflection effect from light that may be output from the flash 140.

Figure 4:
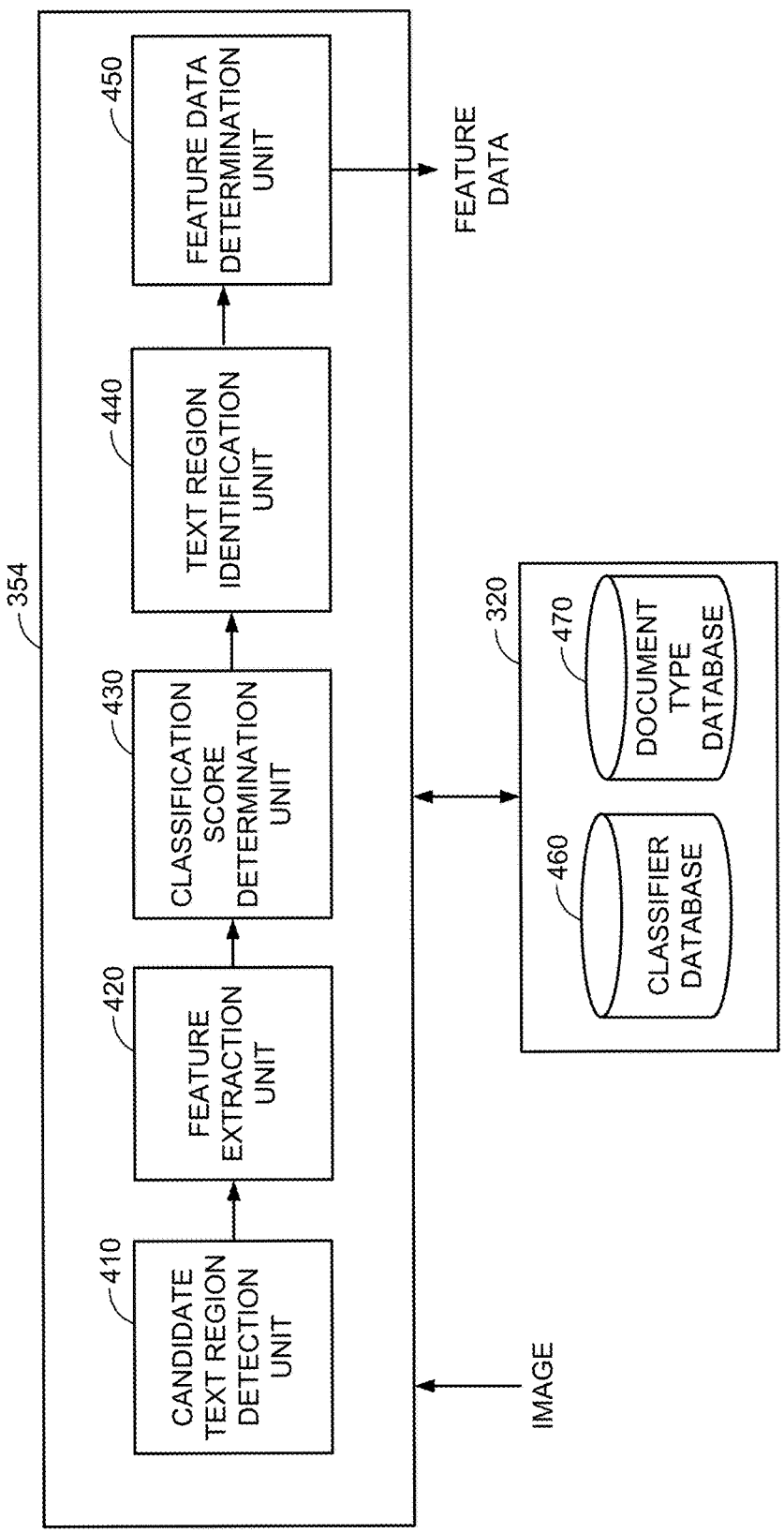
FIG. 4 shows a block diagram of a text region detection unit configured to detect one or more text regions in an image and determine feature data characterizing the one or more text regions, according to one embodiment of the present disclosure.

FIG. 4 shows a block diagram of a text region detection unit 354 configured to detect one or more text regions in an image and determine feature data characterizing the one or more text regions, according to one embodiment of the present disclosure. The text region detection unit 354 may include a candidate text region detection unit 410, a feature extraction unit 420, a classification score determination unit 430, a text region identification unit 440, and a feature data determination unit 450. To detect the plurality of the text regions, the text region detection unit 354 may communicate with the storage unit 320.

In the text region detection unit 354, the candidate text region detection unit 410 may be configured to receive one or more images of a scene and detect one or more candidate text regions in the images. In one embodiment, a candidate text region in an image may be detected by determining one or more blobs with one or more similar properties such as size, color, pattern, and the like in the candidate text region. Upon determining the blobs in the image, the candidate text region detection unit 410 may cluster the blobs in a blob clustering operation. For example, a plurality of blobs having a same or similar color and located in proximity may be clustered into a blob cluster. Each of the blob clusters may also be corrected for skew and filtered to remove artifacts. In addition, a blob cluster in color may be converted into a blob cluster in gray scale. In another embodiment, one or more candidate text regions may be detected in an image based on any other suitable text candidate extraction schemes such as an edge based method, a connected-component based method, a texture based method, or the like. From the detected candidate text regions, the candidate text region detection unit 410 may determine one or more locations and sizes of the candidate text regions in the images. The candidate text regions (e.g., locations and sizes of the candidate text regions) detected in the images may then be provided to the feature extraction unit 420 in the text region detection unit 354.

The feature extraction unit 420 may be configured to receive the candidate text regions from the candidate text region detection unit 410 and extract one or more features from each of the candidate text regions. The features may be extracted from the associated candidate text region by using any suitable feature extraction techniques such as an edge detection technique, a scale-invariant feature transform technique, a template matching technique, a Hough transform technique, etc. In one embodiment, one or more features that are extracted from the candidate text region may be represented as a feature vector. The features extracted from the candidate text regions may then be provided to the classification score determination unit 430 in the text region detection unit 354.

The classification score determination unit 430 may be configured to receive one or more features for each of the candidate text regions from the feature extraction unit 420 and generate a classification score for a predetermined language. From the storage unit 320, a classifier database 460 associated with a plurality of languages (e.g., English, French, German, and the like) may be accessed for identifying whether a candidate text region includes text (e.g., characters) associated with the predetermined language. The classifier database 460 may include a plurality of probability models associated with the plurality of languages. A probability model may be generated using any suitable classification method such as SVM (Support Vector Machine), neural network, MQDF (Modified Quadratic Discriminant Function), etc. For example, a probability model for a language may be represented by a probability distribution function (e.g., a multivariate Gaussian distribution) for features that correspond to the language.

In one embodiment, the classification score determination unit 430 may generate a classification score for each of the candidate text regions based on the extracted features for the associated candidate text region and a probability model for the predetermined language. For example, if a language for identifying a text region is predetermined as English by an input or command of the user 110, a classification score for a candidate text region may be generated based on the probability model for English. The classification score for the candidate text region may indicate a probability that one or more features for the candidate text region are associated with the probability model for English. In another embodiment, the classification score determination unit 430 may determine a plurality of classification scores for the plurality of probability models based on one or more features for each of the candidate text regions to identify whether the candidate text region includes text that is associated with each of the languages for the probability models. The classification scores for the candidate text regions may then be provided to the text region identification unit 440 in the text region detection unit 354.

The text region identification unit 440 may be configured to identify one or more text regions from the candidate text regions based on the classification scores received from the classification score determination unit 430. In one embodiment, a candidate text region may be identified as a text region by determining that a classification score for the candidate text region exceeds a predetermined threshold score. In another embodiment, if the classification scores associated with the plurality of languages for each of the candidate text regions are received, the text region identification unit 440 may select a greatest classification score from the classification scores and determine that the greatest classification score is higher than a predetermined threshold score. The classification scores and the identified text regions (e.g., locations and sizes) are provided to the feature data determination unit 450.

The feature data determination unit 450 may be configured to receive the one or more images, the identified text regions in the images such as locations, sizes, etc. of the identified text regions, and the classification scores for the identified text regions for use in determining feature data characterizing the identified text regions. The feature data may include data or information describing or relating to the identified text regions such as boundary data, document type data, confidence data, mean intensity data, histogram data, polarity data, sharpness data, etc. of the text regions To generate the feature data for the text regions, the feature data determination unit 450 may calculate boundaries, document types, text confidence values, intensity values, polarity values, sharpness values, etc. for the identified text regions. Although the feature data is illustrated as being determined in the identified text regions, the feature data determination unit 450 may determine feature data characterizing a portion including the identified text regions for use in activating the flash 140 for the image sensor 130.

The feature data determination unit 450 may determine boundary data, document type data, and confidence data based on the identified text regions and the classification scores for the text regions. In one embodiment, one or more boundaries of identified text regions in an image may be calculated based on one or more locations and sizes of the text regions. In addition, document type data may be determined by accessing a document type database 470 in a storage unit 320 that may map a plurality of predetermined document types to arrangements or layouts of text regions (e.g., predetermined locations and sizes of the text regions) and predetermined intensities of light from the flash 140. Alternatively, the document type database 470 may be received from an external device via the communication unit 330. For example, the feature data determination unit 450 may select a document type (e.g., a magazine) among a plurality of document types in the document type database 470 based on the locations and sizes of the identified text regions. In this case, the selected document type may be associated with one or more predetermined locations and sizes that are identical or similar to the locations and sizes of the identified text regions. According to some embodiments, the confidence data of the text regions may be determined based on the classification scores for the text regions. For example, a confidence value of a text region may be determined to be proportional to a classification score of the text region.

According to some embodiments, the feature data determination unit 450 may determine mean intensity data and histogram data of the text regions based on one or more intensity values of the text regions in the images. For example, the feature data determination unit 450 may determine the mean intensity data by calculating intensity values for a plurality of pixels of each of the text regions and an average of the intensity values. In addition, the histogram data may be determined by counting the number of each of the calculated intensity values and creating a histogram based on the counted numbers.

The feature data determination unit 450 may calculate intensity values for the text regions in the images along with intensity values of a plurality of pixels of non-text regions in the images to determine polarity data of the text regions. For example, a polarity value of a text region in an image may be determined based on a ratio of a mean intensity value of the text region to a mean intensity value of a non-text region. In one embodiment, sharpness data of the text regions may be determined by calculating a sharpness value of each of the text regions. The determined feature data may then be provided to the flash control unit 358 for determining whether to activate the flash 140 in response to an input or a command of a user to capture one or more subsequent images including the identified text regions.

Figure 5:
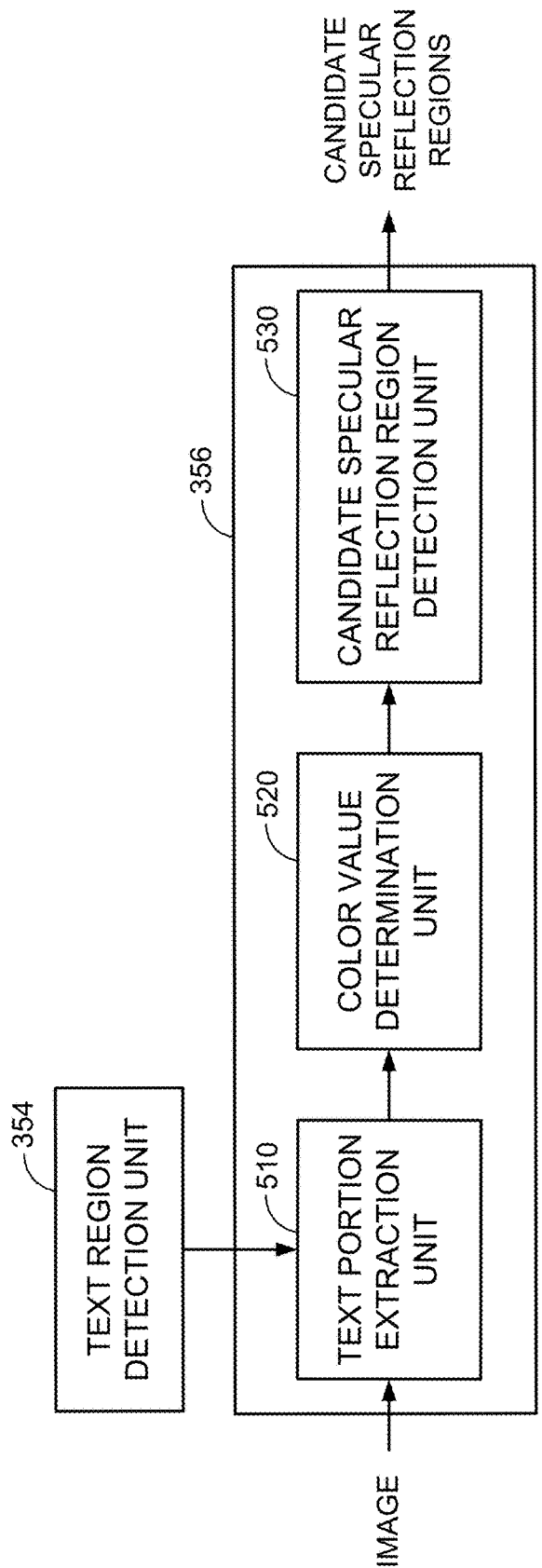
FIG. 5 illustrates a block diagram of a reflection region identification unit configured to identify one or more candidate specular reflection regions in an image of an object with text, according to one embodiment of the present disclosure.

FIG. 5 is a block diagram of a reflection region identification unit 356 configured to identify one or more candidate specular reflection regions in an image of an object with text, according to one embodiment of the present disclosure. The reflection region identification unit 356 may include a text portion extraction unit 510, a color value determination unit 520, and a candidate specular reflection region detection unit 530. Although the reflection region identification unit 356 is shown with the text portion extraction unit 510, it may be configured to identify the candidate specular reflection regions in the image without the text portion extraction unit 510.

The text portion extraction unit 510 in the reflection region identification unit 356 may be configured to receive one or more images provided to the text region detection unit 354 as well as one or more text regions detected in the images from the text region detection unit 354. In one embodiment, the text portion extraction unit 510 may extract a portion including one or more text regions from an image. The text portion extraction unit 510 may provide the extracted portion including the one or more text regions to the color value determination unit 520 in the reflection region identification unit 356.

The color value determination unit 520 may determine a plurality of color values for a plurality of pixels in the extracted portion. In one embodiment, a color value of each of the pixels may represent a color of the pixel in RGB color model or space and include any combination of red (R), green (G), blue (B) values. For example, each of the R, G, and B values may be indicative of an 8-bit color code including a range from 0 to 255. In another embodiment, the color value determination unit 520 may segment the extracted portion into a plurality of portions (e.g., N×M pixels) and calculate an average color value for a plurality of neighboring pixels in each of the portions for determining the plurality of color values for the extracted portion. The color value determination unit 520 may provide the color values (e.g., the R, G, B values or any combination thereof) for the extracted portion to the candidate specular reflection region detection unit 530 in the reflection region identification unit 356. Although the color value determination unit 520 is described as using the RGB color model or space, it may also employ any suitable color model or space such as HSV, CMYK, HSL, LAB, HSI, YUV, or the like.

The candidate specular reflection region detection unit 530 may detect one or more candidate specular reflection regions in the extracted portion including the text regions based on the plurality of color values for the extracted portion. In one embodiment, one or more regions having color values indicative of a white color may be identified as the candidate specular reflection regions. In this case, the white color may represent a color produced by any suitable combination of R, G, and B colors. For example, a white color may be represented by a value in a predetermined range of color values (e.g., 250 to 255) for each of the R, G, and B values. The identified candidate specular reflection regions may be provided to the flash control unit 358 for use in determining whether to activate the flash 140 for the image sensor 130. Additionally, the candidate specular reflection region detection unit 530 may determine binarized shapes of the detected candidate specular reflection regions. In this case, the candidate specular reflection region detection unit 530 may also provide the binarized shapes to the flash control unit 358, which may determine one or more specular reflection regions from the candidate specular reflection regions based on the binarized shapes.

Figure 6:
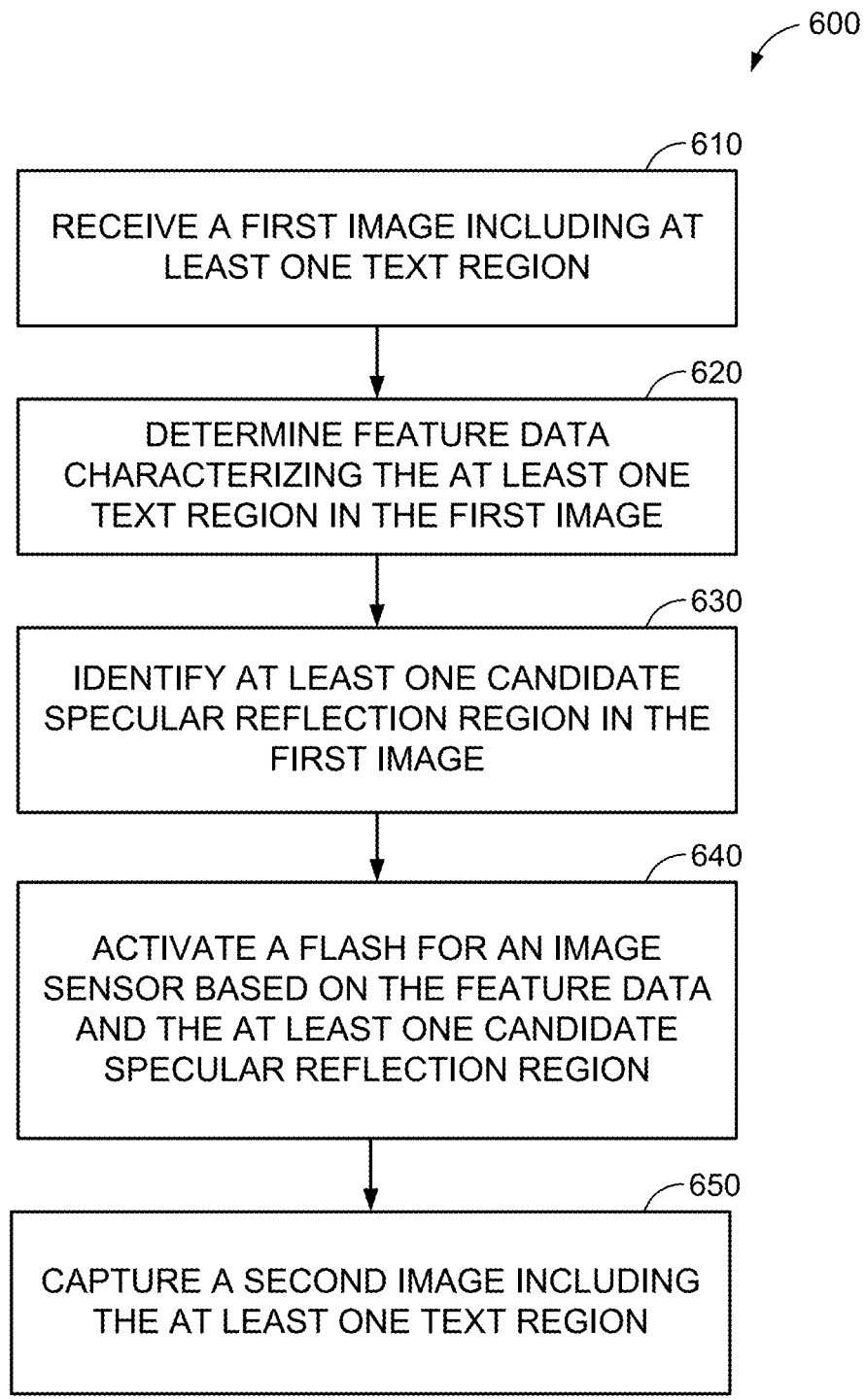
FIG. 6 is a flowchart of a method for automatically activating a flash for capturing an image including at least one text region based on one or more images that include the at least one text region, according to one embodiment of the present disclosure.

FIG. 6 is a flowchart of a method 600 for automatically activating the flash 140 of the electronic device 120 for capturing an image including at least one text region based on one or more images that include the at least one text region, according to one embodiment of the present disclosure. Initially, the processor 350 in the electronic device 120 may receive a first image including at least one text region and provide the first image to the text region detection unit 354 and the reflection region identification unit 356 in the processor 350, respectively, at 610. In one embodiment, the image sensor 130 of the electronic device 120 may capture an image of at least one text region as the first image. The text region detection unit 354 may receive the first image and determine feature data characterizing the at least one text region, at 620, as described above with reference to FIG. 4.

At 630, the reflection region identification unit 356 may identify at least one candidate specular reflection region in the first image. In one embodiment, a plurality of color values for a plurality of pixels in the first image may be determined for identifying the at least one candidate specular reflection region, as described above with reference to FIG. 5. In another embodiment, the reflection region identification unit 356 may convert the first image into a grayscale image having a plurality of grayscale pixels and then determine intensities for the plurality of grayscale pixels. In this case, if each of the intensity values for the grayscale pixels in one or more regions is determined to be indicative of a white color, the one or more regions may be identified as the at least one candidate specular reflection region. Given an 8-bit intensity code, for example, the white color may be represented by a value "255" or a value (e.g., "250," "251," "252," "253," and "254") substantially similar or close to the value "255."

The flash control unit 358 may activate the flash 140 for the image sensor 130 based on the feature data received from the text region detection unit 354 and the at least one candidate specular reflection region received from the reflection region identification unit 356, at 640. In addition, the flash control unit 358 may adjust an intensity of light from the flash 140 and/or a direction of the flash 140 for use in activating the flash 140. Upon activating the flash 140, the image sensor 130 may capture a second image including the at least one text region, at 650.

Figure 7:
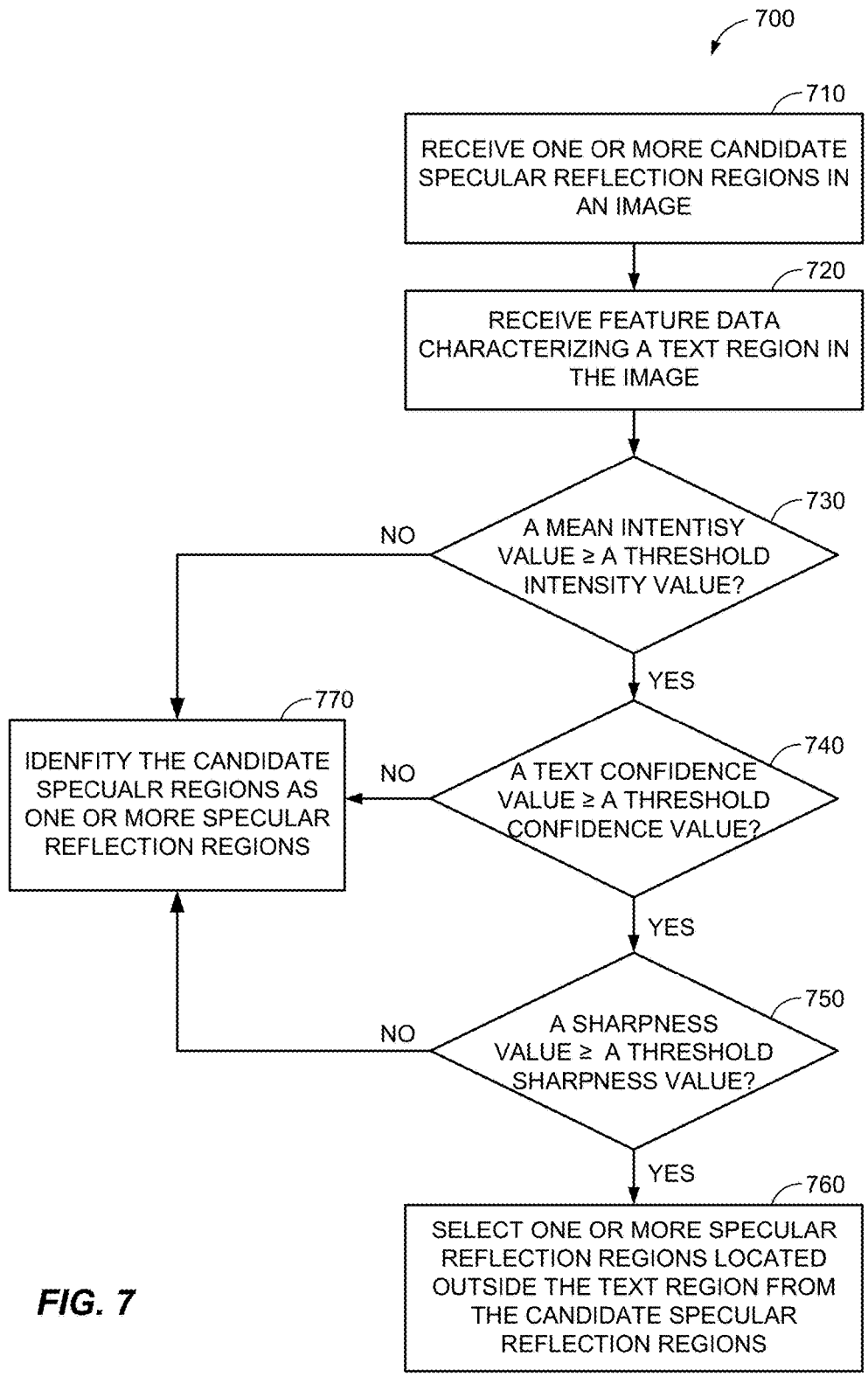
FIG. 7 is a flowchart of a method performed by a flash control unit configured to select one or more specular reflection regions from one or more candidate specular reflection regions in an image including a text region based on feature data characterizing the text region, according to one embodiment.

FIG. 7 is a flowchart of a method 700 performed by the flash control unit 358 configured to select one or more specular reflection regions from one or more candidate specular reflection regions in an image including a text region based on feature data characterizing the text region, according to one embodiment of the present disclosure. Initially, the flash control unit 358 may receive the one or more specular reflection regions in the image from the reflection region identification unit 356, at 710. In addition, the feature data characterizing the text region in the image may be received from the text region detection unit 354, at 720. For example, the feature data may include a mean intensity value, a text confidence value, a sharpness value, a boundary, etc. of the text region. Although the method 700 is shown with feature data characterizing one text region, the flash control unit 358 may select one or more specular reflection regions from one or more candidate reflection specular reflection regions based on feature data characterizing a plurality of text regions. In this case, the flash control unit 358 may perform the method 700 for each of the text regions to select the specular reflection regions from the candidate specular reflection regions.

The method 700 may determine if a mean intensity value for a text region is greater than or equal to a predetermined threshold intensity value, at 730. If it is determined that the mean intensity value is greater than or equal to the predetermined threshold intensity value (i.e., YES at 730), the method may proceed to 740 and the flash control unit 358 may determine if a text confidence value for the text region is greater than or equal to a predetermined threshold confidence value. Otherwise (i.e., NO at 730), the candidate specular reflection regions may be identified as one or more specular reflection regions for use in determining whether to activate the flash 140, at 770. If it is determined that the text confidence value for the text region is greater than or equal to the predetermined threshold confidence value (i.e., YES at 740), the method may proceed to 750 and the flash control unit 358 may determine if a sharpness value for the text region is greater than or equal to a predetermined sharpness value. Otherwise (i.e., NO at 740), the flash control unit 358 may identify the candidate specular reflection regions as the specular reflection regions, at 770. If it is determined that the sharpness value is greater than or equal to the predetermined sharpness value (i.e., YES at 750), the flash control unit 358 may select one or more regions located outside the text region from the candidate specular reflection regions based on the boundary of the text region as the specular reflection regions, at 760. Otherwise (i.e., NO at 750), the candidate specular reflection regions may be identified as the specular reflection regions, at 770. Although the method 700 is illustrated as proceeding to 760 if three conditions are satisfied at 740 to 760, the flash control unit 358 may be configured to select one or more specular reflection regions outside the text region from the candidate specular reflection regions if at least one of the conditions is satisfied. Alternatively, the text region detection unit 354 may include a classification module configured to generate one or more classifiers based on the mean intensity, the text confidence, the sharpness, etc. for the text region by using any suitable classification method such as SVM (Support Vector Machine), neural network, etc. The classification module may use the classifiers to identify one or more specular reflection regions from one or more candidate specular reflection regions.

Figure 8:
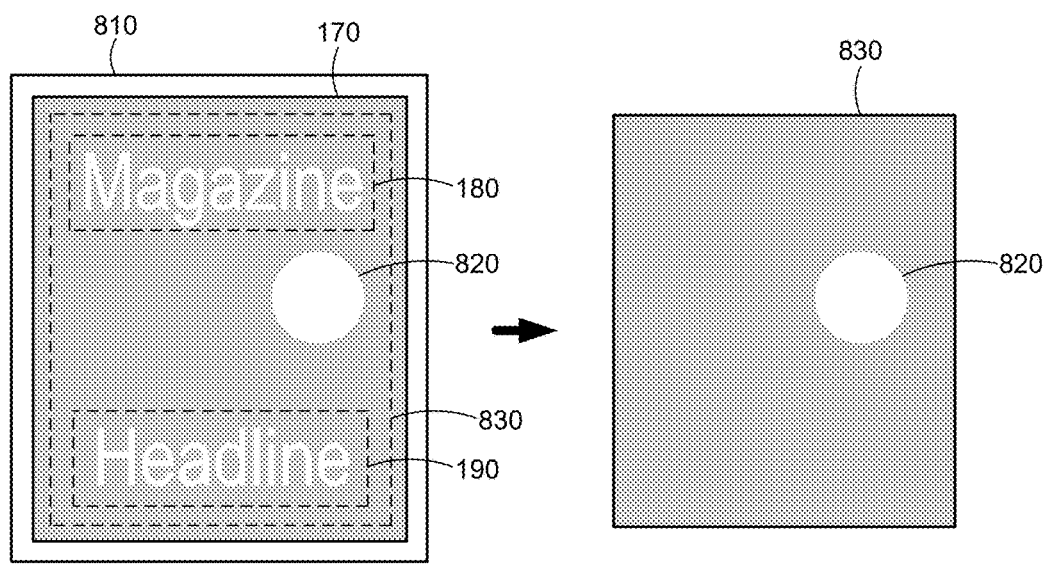
FIG. 8 describes a flow diagram for identifying a plurality of candidate specular reflection regions in an image of an object with a plurality of text regions and selecting a specular reflection region located outside the plurality of text regions among the plurality of candidate specular reflection regions, according to one embodiment of the present disclosure.

FIG. 8 describes a flow diagram for identifying a plurality of candidate specular reflection regions 180, 190, and 820 in an image 810 of an object 170 with a plurality of text regions 180 and 190 and selecting a specular reflection region 820 located outside the plurality of text regions 180 and 190 among the plurality of candidate specular reflection regions 180, 190, 820, according to one embodiment of the present disclosure. The image sensor 130 may capture the image 810 including the object 170 (e.g., a magazine) with the plurality of text regions 180 and 190 without using the flash 140. As shown, the image 810 may include the text region 180 having text characters "Magazine" that are white in color and the text region 190 having text characters "Headline" that are white in color. In addition, the image 810 may include a specular reflection region 820, which may be characterized by a white color and caused by a specular reflection of light from a light source.

After the image 810 is captured, the text region detection unit 354 in the processor 350 may detect the plurality of text regions 180 and 190 in the image 810 and determine feature data characterizing the text regions 180 and 190. In one embodiment, the plurality of text regions 180 and 190 may be identified by detecting a plurality of candidate text regions in the images and generating a classification score for a set of features extracted from each of the candidate text regions based on the classifier database 460 in the storage unit 320. In addition, the feature data determination unit 450 may determine boundaries, text confidence values, mean intensity values, sharpness values, etc. for the text regions 180 and 190 to generate the feature data, as described above with reference to FIG. 4. The feature data characterizing the text regions 180 and 190 in the image 810 may then be provided to the flash control unit 358 in the processor 350.

The reflection region identification unit 356 in the processor 350 may identify the plurality of candidate specular reflection regions 180, 190, and 820 from the image 810. In this process, the text portion extraction unit 510 in the reflection region identification unit 356 may extract a portion 830 including the text regions 180 and 190 from the image 810. According to one embodiment, the color value determination unit 520 in the reflection region identification unit 356 may determine a plurality of color values for a plurality of pixels in the extracted portion 830 and identify the candidate specular reflection regions 180, 190, and 820, each of which has a color value indicative of a white color. The identified candidate specular reflection regions 180, 190, and 820 in the image 810 may then be provided to the flash control unit 358 in the processor 350.

The flash control unit 358 may receive the feature data (e.g., boundaries, text confidence values, mean intensity values, sharpness values, etc.) characterizing the text regions 180 and 190 and the candidate specular reflection regions 180, 190, and 820. The specular reflection region 820 located outside the identified text regions 180 and 190 may be selected from the candidate specular reflection regions 180, 190, and 820 based on at least one of the boundaries, the text confidence values, and the sharpness values for the text regions 180 and 190, as described above with reference to FIG. 7. In this case, the flash control unit 358 may select the specular reflection region 820 from the candidate specular reflection regions 180, 190, and 820 based on the boundaries representing locations and sizes of the text regions 180 and 190 in the image 810. Based on the specular reflection region 820 in the extracted portion 830, the flash control unit 358 may determine that the flash 140 is to be activated for capturing one or more subsequent images including the object 170.

Figure 9:
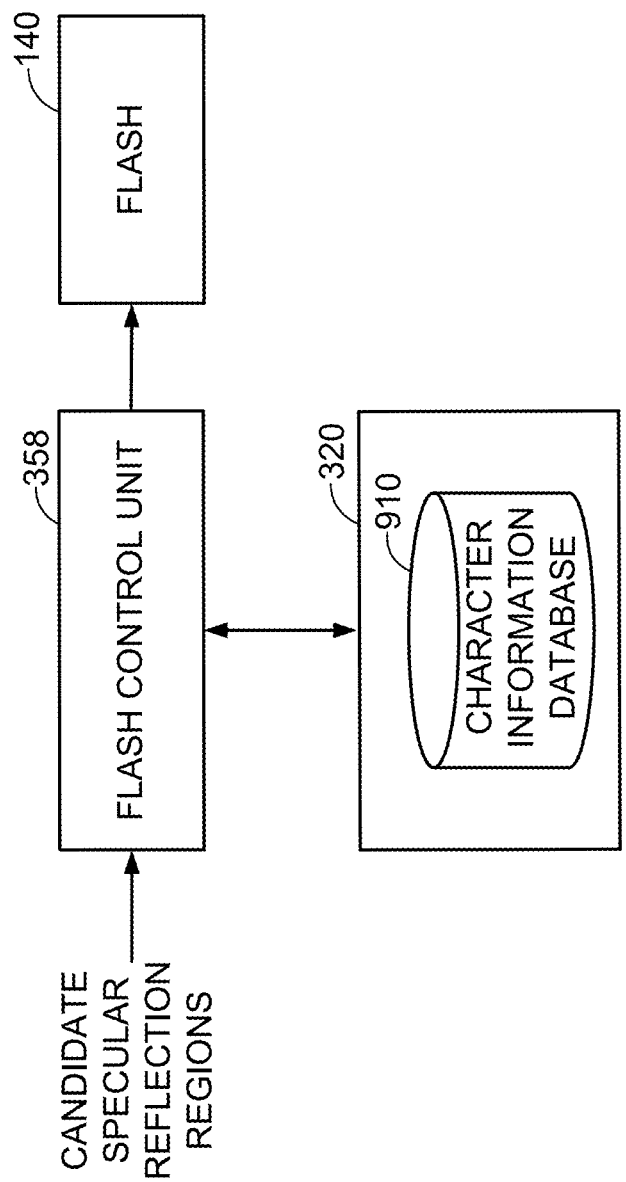
FIG. 9 illustrates a block diagram of a method performed by a flash control unit for activating a flash based on a plurality of candidate specular reflection regions and a character information database, according to one embodiment of the present disclosure.

FIG. 9 is a block diagram of a method performed by the flash control unit 358 for activating the flash 140 based on a character information database 910 and one or more candidate specular reflection regions in an image including at least one text region, according to one embodiment of the present disclosure. The flash control unit 358 may receive the candidate specular reflection regions in the image from the reflection region identification unit 356. In addition, the flash control unit 358 may communicate with the storage unit 320 including the character information database 910. According to one embodiment, the flash control unit 358 may be configured to access the character information database 910 in the storage unit 320 and select one or more specular reflection regions from the received candidate specular reflection regions. The character information database 910 may include pattern or geometric data of a plurality of characters used in each of a plurality of languages (e.g., English, French, German, Chinese, etc.), images of glyphs representing the plurality of characters, and/or at least one feature associated with each individual glyph.

In some embodiments, the flash control unit 358 may identify the at least one text regions overlapping the received candidate specular reflection regions based on the character information database 910 for selecting the specular reflection regions from the candidate specular reflection regions. For example, the flash control unit 358 may identify one or more patterns or symbols (e.g., one or more stroke widths of characters) in the candidate specular reflection regions and compare the identified patterns or symbols with the pattern or geometric data of the plurality of characters from the character information database 910. In this case, if a similarity between the identified patterns or symbols and pattern or geometric data for a specified character in a language is determined to exceed a predetermined similarity threshold, the patterns or symbols in the received candidate specular reflection regions may be recognized as the specified character. The flash control unit 358 may then select one or more regions located outside the patterns and symbols for the specified character from the received candidate specular reflection regions as the specular reflection regions. Based on the selected specular reflection regions, the flash control unit 358 may determine whether to activate the flash 140 for capturing one or more subsequent images including the at least one text region in response to an input or a command of a user 110.

Figure 10:
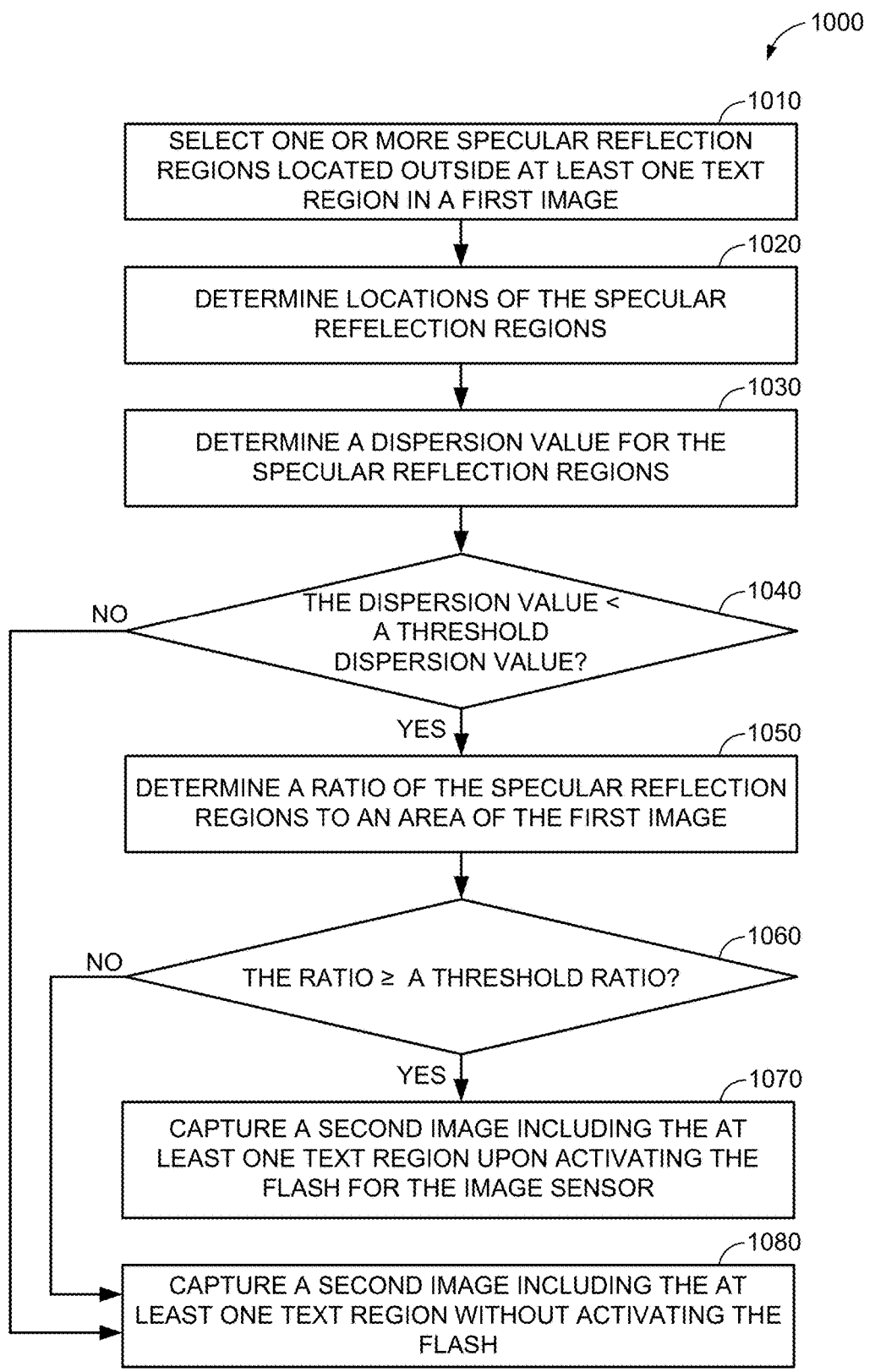
FIG. 10 is a flowchart of a method performed by a flash control unit configured to determine whether to activate a flash for an image sensor based on one or more specular reflection regions that are located outside at least one text region, according to one embodiment of the present disclosure.

FIG. 10 is a flowchart of a method 1000 performed by the flash control unit 358 configured to determine whether to activate the flash 140 for the image sensor 130 based on one or more specular reflection regions selected from one or more candidate specular reflection regions in a first image including at least one text region, according to one embodiment of the present disclosure. From the candidate specular reflection regions, the flash control unit 358 may select the specular reflection regions that are located outside the at least one text region, at 1010. A location of each of the selected specular reflection regions may be determined based on locations of a plurality of pixels in the associated specular reflection region in the first image, at 1020.

At 1030, the flash control unit 358 may determine a dispersion value for the selected specular reflection regions in the first image based on the locations of the selected specular reflection regions. In this case, the dispersion value may indicate a degree of dispersion for the selected specular reflection regions in the first image. At 1040, the method 1000 may determine if the dispersion value for the specular reflection regions is less than a threshold dispersion value. If it is determined that the dispersion value is less than the threshold value (i.e., YES at 1040), the method 1000 may proceed to 1050 and the flash control unit 358 may determine a ratio of the specular reflection regions to an area of the first image. For example, the flash control unit 358 may divide a number of pixels in the specular reflection regions in an image by a total number of pixels in the image to determine the ratio. Otherwise (i.e., NO at 1040), the method may proceed to 1080 and the image sensor 130 may capture a second image including the at least one text region without activating the flash 140.

After the ratio of the specular reflection regions to the area of the first image is determined, the method 1000 may determine if the ratio is greater than or equal to a threshold ratio, at 1060. If it is determined that the ratio is greater than or equal to the threshold ratio (i.e., YES at 1060), the flash control unit 358 may proceed to 1070 and the image sensor 130 may capture a second image including the at least one text region upon activating the flash 140 for the image sensor 130. On the other hand, if it is determined that the ratio is less than the threshold ratio (i.e., NO at 1060), the image sensor 130 may capture a second image including at least one text region without activating the flash 140, at 1080. Although the method 1000 is illustrated as proceeding to 1070 if two conditions are satisfied at 1040 and 1060, the flash control unit 358 may allow the image sensor 130 to capture a second image including the at least one text region upon activating the flash 140 if at least one of the conditions is satisfied. Alternatively, the text region detection unit 354 may generate one or more classifiers based on the dispersion value and the threshold ratio for the selected specular reflection regions by using any suitable classification method such as SVM (Support Vector Machine), neural network, etc. The classifiers may then be used to determine whether to activate the flash 140 for capturing the second image.

Figure 11:
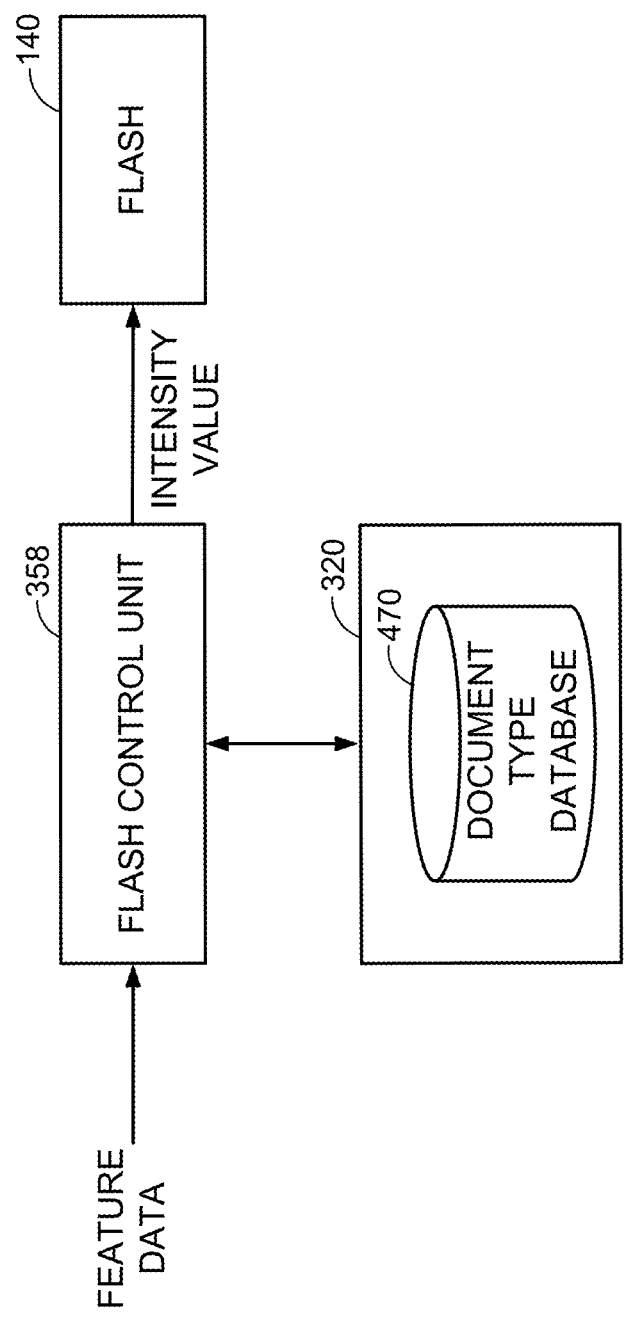
FIG. 11 illustrates a block diagram of a method performed by a flash control unit for adjusting an intensity of light to be output from a flash based on feature data characterizing at one or more text regions in an image and a document type database, according to one embodiment of the present disclosure.

FIG. 11 illustrates a block diagram of a method performed by the flash control unit 358 for adjusting an intensity of light to be output from the flash 140 based on feature data characterizing one or more text regions in an image and the document type database 470, according to one embodiment of the present disclosure. The flash control unit 358 may receive the feature data including a document type, one or more sharpness values, one or more mean intensity values, etc. from the text region detection unit 354. In one embodiment, the flash control unit 358 may be configured to access the document type database 470 in the storage unit 320 for adjusting an intensity of light to be output from the flash 140 based on the received document type in the feature data. The document type database 470 may map a plurality of predetermined document types (e.g., a magazine, a business card, a calendar, etc.) to a plurality of predetermined intensities of light from the flash 140, and the like. For example, the flash control unit 358 may select a predetermined intensity of light associated with the received document type from the plurality of predetermined intensities of light as the intensity of light to be output from the flash 140.

According to some embodiments, the flash control unit 358 may be configured to adjust an intensity of light from the flash 140 based on at least one of the sharpness values and the mean intensity values in the received feature data. For example, the intensity of light from the flash 140 may be determined to be inversely proportional to at least one of the sharpness value and the mean intensity values of the feature data. In another example, if a sharpness value of the feature data is less than a threshold sharpness value, the flash control unit 358 may increase the intensity of light to be output from the flash 140. Additionally or alternatively, if a mean intensity value of the feature data is less than a threshold intensity value, the flash control unit 358 may increase the intensity of light to be output from the flash 140. The adjusted intensity of light may be provided to the flash 140 for use in activating the flash 140 for the image sensor 130.

Figure 12:
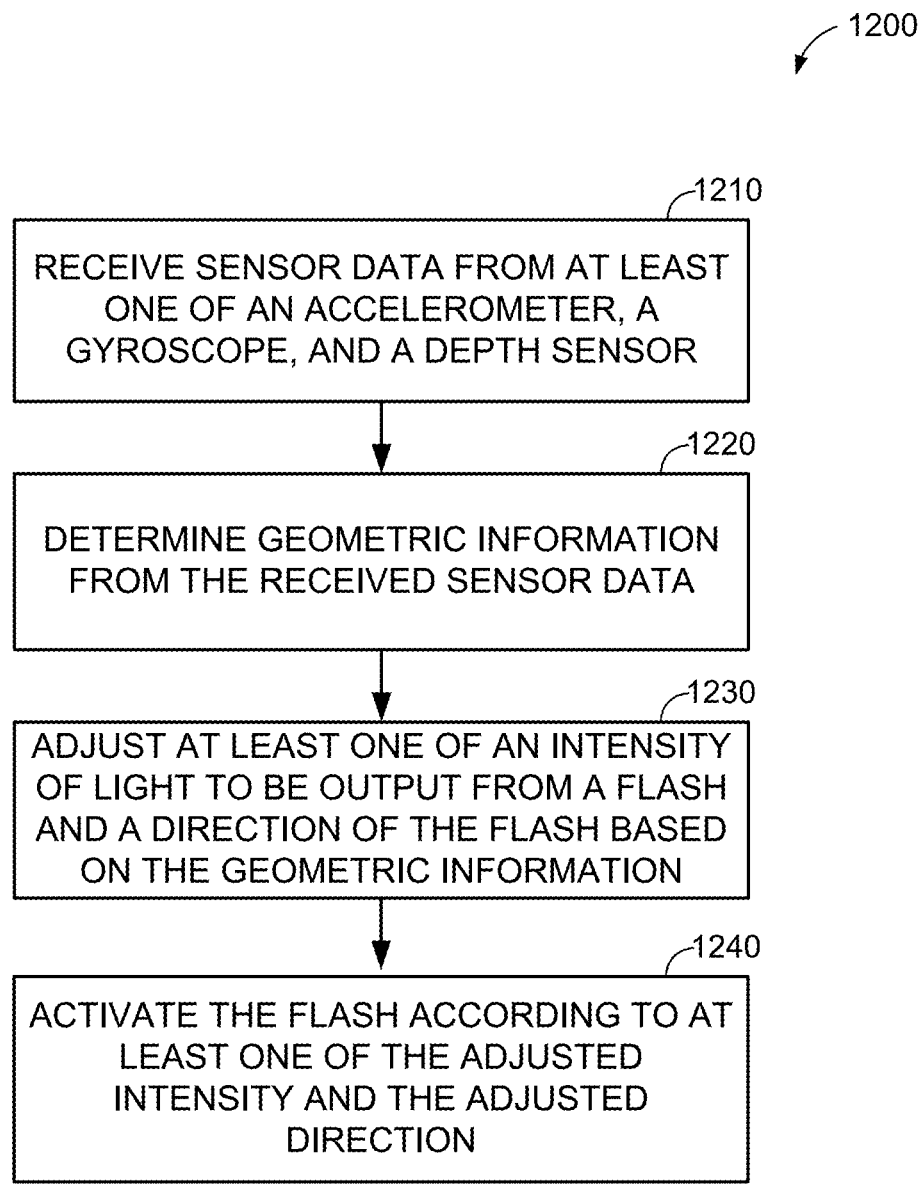
FIG. 12 is a flowchart of a method performed by a flash control unit for activating a flash for an image sensor by adjusting at least one of an intensity of light to be output from the flash and a direction of the flash based on sensor data from one or more sensors, according to one embodiment of the present disclosure.

FIG. 12 is a flowchart of a method 1200 performed by a flash control unit 358 for activating the flash 140 for the image sensor 130 by adjusting at least one of an intensity of light to be output from the flash 140 and a direction of the flash 140 based on sensor data from one or more sensors, according to one embodiment of the present disclosure. Initially, the flash control unit 358 may receive the sensor data from at least one of the gyroscope 342, the accelerometer 344, and the depth sensor 346 in the electronic device 120, at 1210. The sensor data may be used for determining geometric information indicative of depth information (e.g., depth or distance) of the image sensor 130 to one or more text regions in an image, an angle between a plane in which the text regions are disposed and a plane in which the image sensor 130 is disposed, etc., at 1220.

At 1230, the flash control unit 358 may adjust at least one of the intensity to be output from the flash 140 and the direction of the flash 140 based on the geometric information (i.e., the depth information or the angle between the plane of the text regions and the plane of the image sensor). According to one embodiment, if the angle is less than a first threshold angle, the flash control unit 358 may increase the intensity of light to be output from the flash 140. In addition, if the angle is higher than or equal to a second threshold angle, the flash control unit 358 may reduce the intensity of light from the flash 140. In this case, the second threshold angle may be greater than the first threshold angle. According to some embodiments, the flash 140 may be movably disposed on the electronic device 120 and the direction of the flash 140 may be adjusted based on the angle between the plane of the text regions and the plane of the electronic device 120 or the image sensor 130. For example, if the plane for the electronic device 120 is parallel to the plane for the text regions, the flash control unit 358 may adjust a direction of the flash 140 to prevent a specular reflection effect from light that may be output from the flash 140. After adjusting the intensity of light from the flash 140 and/or the direction of the flash 140, the flash may be activated according to at least one of the adjusted intensity and the adjusted direction, at 1240.

Figure 13:
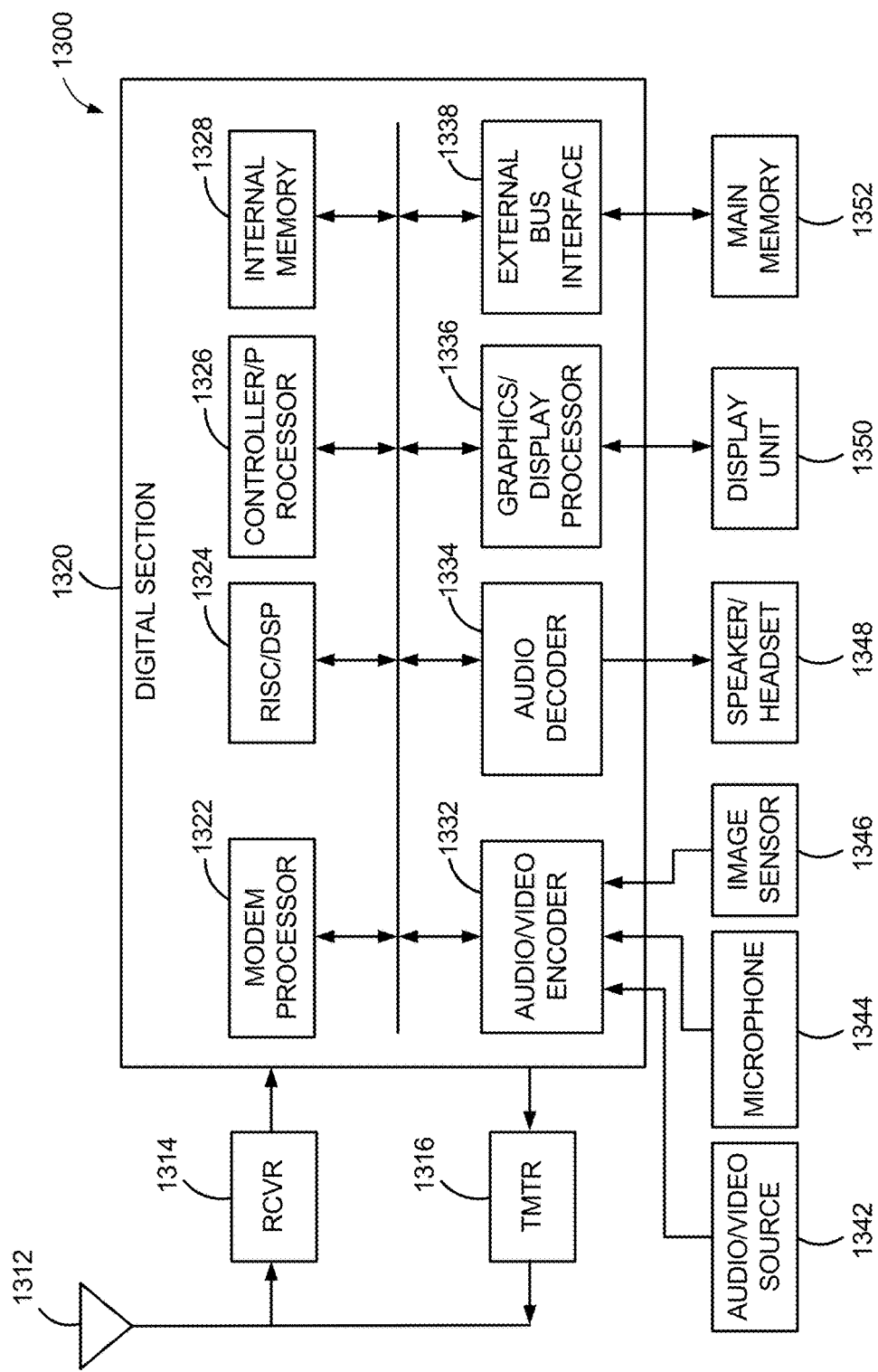
FIG. 13 is a block diagram of an exemplary electronic device in which the methods and apparatus for automatically activating a flash for an image sensor of an electronic device may be implemented, according to one embodiment of the present disclosure.

FIG. 13 is a block diagram of an exemplary electronic device in which the methods and apparatus for automatically activating a flash for an image sensor of an electronic device may be implemented, according to one embodiment of the present disclosure. The configuration of the electronic device 1300 may be implemented in the electronic devices according to the above embodiments described with reference to FIGS. 1 to 12. The electronic device 1300 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1300 may communicate directly with another mobile device, e.g., using Wi-Fi Direct or Bluetooth.

The electronic device 1300 is capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides samples such as the conditioned and digitized digital signal to a digital section for further processing. On the transmit path, a transmitter (TMTR) 1316 receives data to be transmitted from a digital section 1310, processes and conditions the data, and generates a modulated signal, which is transmitted via the antenna 1312 to the base stations. The receiver 1314 and the transmitter 1316 may be part of a transceiver that may support CDMA, GSM, LTE, LTE Advanced, etc.

The digital section 1310 includes various processing, interface, and memory units such as, for example, a modem processor 1322, a reduced instruction set computer/digital signal processor (RISC/DSP) 1324, a controller/processor 1326, an internal memory 1328, a generalized audio/video encoder 1332, a generalized audio decoder 1334, a graphics/display processor 1336, and an external bus interface (EBI) 1338. The modem processor 1322 may perform processing for data transmission and reception, e.g., encoding, modulation, demodulation, and decoding. The RISC/DSP 1324 may perform general and specialized processing for the electronic device 1300. The controller/processor 1326 may perform the operation of various processing and interface units within the digital section 1310. The internal memory 1328 may store data and/or instructions for various units within the digital section 1310.

The generalized audio/video encoder 1332 may perform encoding for input signals from an audio/video source 1342, a microphone 1344, an image sensor 1346, etc. The generalized audio decoder 1334 may perform decoding for coded audio data and may provide output signals to a speaker/headset 1348. The graphics/display processor 1336 may perform processing for graphics, videos, images, and texts, which may be presented to a display unit 1350. The EBI 1338 may facilitate transfer of data between the digital section 1310 and a main memory 1352.

The digital section 1310 may be implemented with one or more processors, DSPs, microprocessors, RISCs, etc. The digital section 1310 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed by an electronic device, of automatically activating a flash for an image sensor of the electronic device, the method comprising:
   receiving a first image including at least one text region;
   detecting the at least one text region in the first image;
   identifying at least one candidate specular reflection region in the first image; and
   in response to detecting the at least one text region and identifying the at least one candidate specular reflection region:
   activating the flash; and
   capturing a second image including the at least one text region while the flash is active.

2. The method of claim 1, wherein receiving the first image comprises receiving the first image including the at least one text region in a preview mode.

3. The method of claim 1, wherein detecting the at least one text region in the first image comprises:
   determining, from the at least one text region, feature data including at least one of confidence data, boundary data, sharpness data, document type data, mean intensity data, polarity data, or histogram data.

4. The method of claim 1, wherein identifying the at least one candidate specular reflection region comprises:
   determining a plurality of color values for a plurality of pixels in an extracted portion of the at least one candidate specular reflection region, the extracted portion including the at least one text region from the first image; and
   identifying the at least one candidate specular reflection region based on the plurality of color values.

5. The method of claim 1, wherein activating the flash comprises:
   selecting, from the at least one candidate specular reflection region, one or more specular reflection regions located outside the at least one text region; and
   activating the flash based on the one or more specular reflection regions.

6. The method of claim 5, wherein activating the flash comprises:
   determining location information of the one or more specular reflection regions in the first image;
   calculating a dispersion value indicative of a degree of dispersion for the one or more specular reflection regions in the first image based on the location information; and
   activating the flash in response to calculating that the dispersion value is less than a threshold dispersion value.

7. The method of claim 5, wherein activating the flash comprises:
   determining a ratio of the one or more specular reflection regions to an area of the first image; and
   activating the flash in response to determining that the ratio is greater than or equal to a threshold ratio.

8. The method of claim 1, wherein activating the flash comprises:
   identifying one or more text regions overlapping the at least one candidate specular reflection region based on character information for at least one character in the at least one text region;
   selecting, from at least one candidate specular reflection region, one or more specular reflection regions located outside the identified one or more text regions; and
   activating the flash based on the one or more specular reflection regions.

9. The method of claim 1, wherein activating the flash comprises adjusting an intensity of light output from the flash based on at least one of feature data characterizing the at least one text region and sensor data from one or more sensors in the electronic device.

10. The method of claim 1, wherein activating the flash comprises adjusting a direction of the flash based on an angle between a plane in which the at least one text region is disposed and a plane in which the image sensor is disposed.

11. The method of claim 1, wherein activating the flash comprises activating the flash a plurality of times for capturing the second image.

12. The method of claim 1, wherein the electronic device comprises a plurality of image sensors including the image sensor, and
wherein the plurality of image sensors is configured to capture a plurality of images including the first image including the at least one text region and the second image including the at least one text region.

13. The method of claim 1, wherein receiving the first image comprises:
determining a focus value of the first image;
adjusting a focus parameter for the image sensor in response to determining that the focus value is less than a threshold focus value; and
receiving another image including the at least one text region as the first image based on the adjusted focus parameter.

14. The method of claim 1, wherein the electronic devices comprises a mobile device.

15. An electronic device for automatically activating a flash for an image sensor, the electronic device comprising:
a processor configured to receive a first image including at least one text region, the processor comprising:
a text region detection unit configured to detect feature data characterizing the at least one text region in the first image;
a reflection region identification unit configured to identify at least one candidate specular reflection region in the first image; and
a flash control unit configured to, in response to detecting the at least one text region and identifying the at least one candidate specular reflection region, activate the flash,
wherein the image sensor is configured to capture a second image including the at least one text region while the flash is active.

16. The electronic device of claim 15, wherein the processor is configured to receive the first image including the at least one text region in a preview mode.

17. The electronic device of claim 15, wherein the text region detection unit is configured to determine, from the at least one text region, feature data including at least one of confidence data, boundary data, sharpness data, document type data, mean intensity data, polarity data, or histogram data.

18. The electronic device of claim 15, wherein the reflection region identification unit is configured to extract a portion including the at least one text region from the first image, determine a plurality of color values for a plurality of pixels in the extracted portion, and identify the at least one candidate specular reflection region based on the plurality of color values.

19. The electronic device of claim 15, wherein the flash control unit is configured to:

select, from the at least one candidate specular reflection region, one or more specular reflection regions located outside the at least one text region; and
activate the flash based on the one or more specular reflection regions.

20. The electronic device of claim 19, wherein the flash control unit is configured to:
determine location information of the one or more specular reflection regions in the first image;
calculate a dispersion value indicative of a degree of dispersion for the one or more specular reflection regions in the first image based on the location information; and
activate the flash in response to calculating that the dispersion value is less than a threshold dispersion value.

21. The electronic device of claim 19, wherein the flash control unit is configured to:
determine a ratio of the one or more specular reflection regions to an area of the first image; and
activate the flash in response to determining that the ratio of the one or more specular reflection regions to the area of the first image is greater than or equal to a threshold ratio.

22. The electronic device of claim 15, wherein the flash control unit is configured to:
identify one or more text regions overlapping the at least one candidate specular reflection region based on character information for at least one character in the at least one text region;
select, from at least one candidate specular reflection region, one or more specular reflection regions located outside the identified one or more text regions; and
activate the flash based on the one or more specular reflection regions.

23. The electronic device of claim 15, wherein the flash control unit is further configured to adjust an intensity of light output from the flash based on at least one of the feature data characterizing the at least one text region and sensor data from one or more sensors in the electronic device.

24. The electronic device of claim 15, wherein the flash control unit is further configured to adjust a direction of the flash based on an angle between a plane in which the at least one text region is disposed and a plane in which the image sensor is disposed.

25. The electronic device of claim 15, wherein the flash control unit is further configured to activate the flash a plurality of times for capturing the second image.

26. The electronic device of claim 15, further comprising a plurality of image sensors including the image sensor, and
wherein the plurality of image sensors is configured to capture a plurality of images including the first image including the at least one text region and the second image including the at least one text region.

27. The electronic device of claim 15, wherein the processor further comprises an image sensor control unit configured to determine a focus value of the first image and adjust a focus parameter for the image sensor in response to determining that the focus value is less than a threshold focus value, and
wherein the processor is configured to receive another image including the at least one text region as the first image based on the adjusted focus parameter.

28. The electronic device of claim 15, wherein the processor is integrated into a mobile device.

29. A non-transitory computer-readable storage medium comprising instructions for automatically activating a flash for an image sensor in an electronic device, the instructions causing a processor of the electronic device to perform the operations of:

receiving a first image including at least one text region;
 detecting the at least one text region in the first image;
 identifying at least one candidate specular reflection region in the first image; and
 in response to detecting the at least one text region and identifying the at least one candidate specular reflection region:
  activating the flash; and
  capturing a second image including the at least one text region while the flash is active.

30. An electronic device for automatically activating a flash for an image sensor, comprising:

means for receiving a first image including at least one text region;
 means for detecting the at least one text region in the first image;
 means for identifying at least one candidate specular reflection region in the first image; and
 in response to detecting the at least one text region and identifying the at least one candidate specular reflection region:
  means for activating; and
  means for capturing a second image including the at least one text region while the flash is active.

\* \* \* \* \*